Patented July 28, 1925.

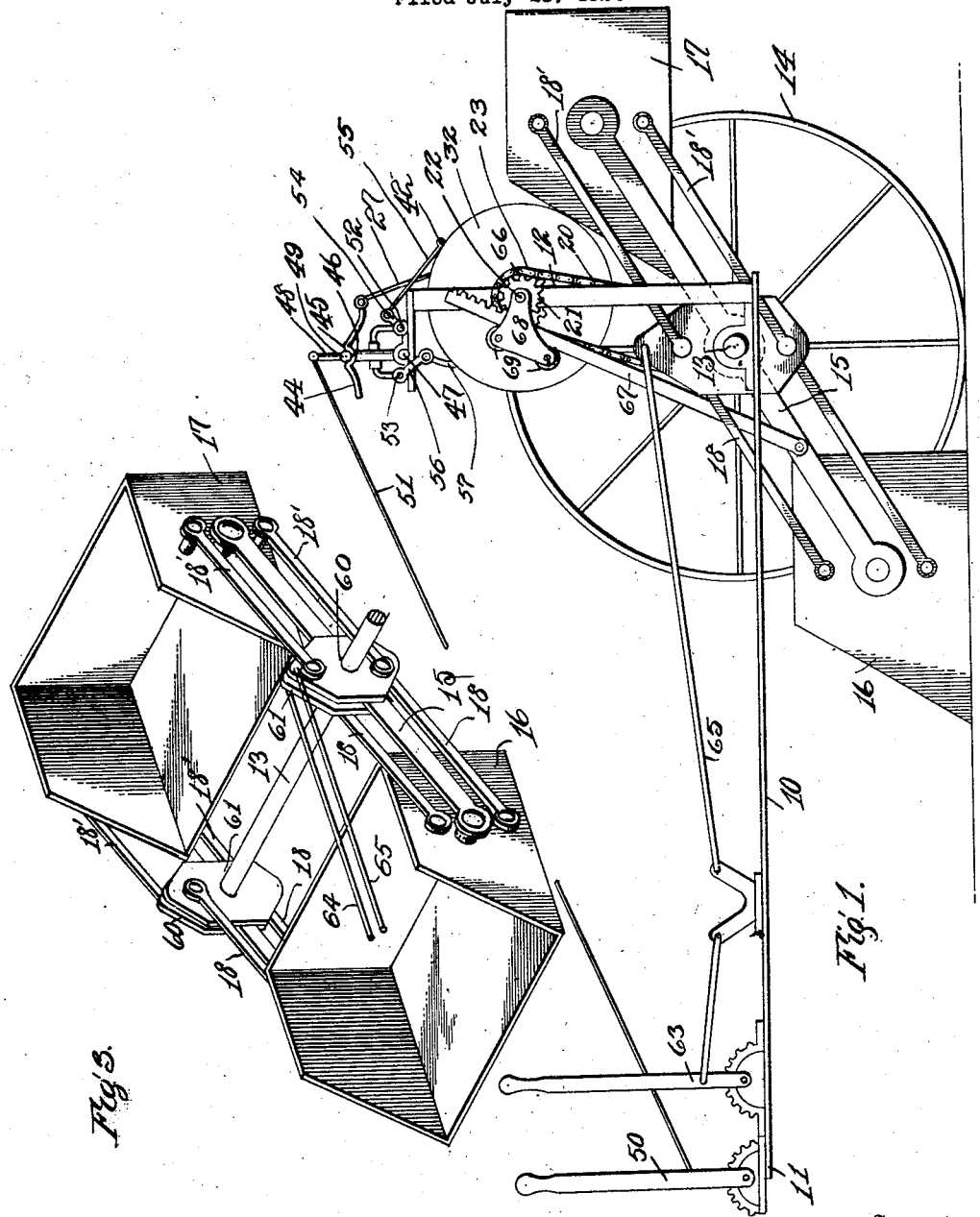

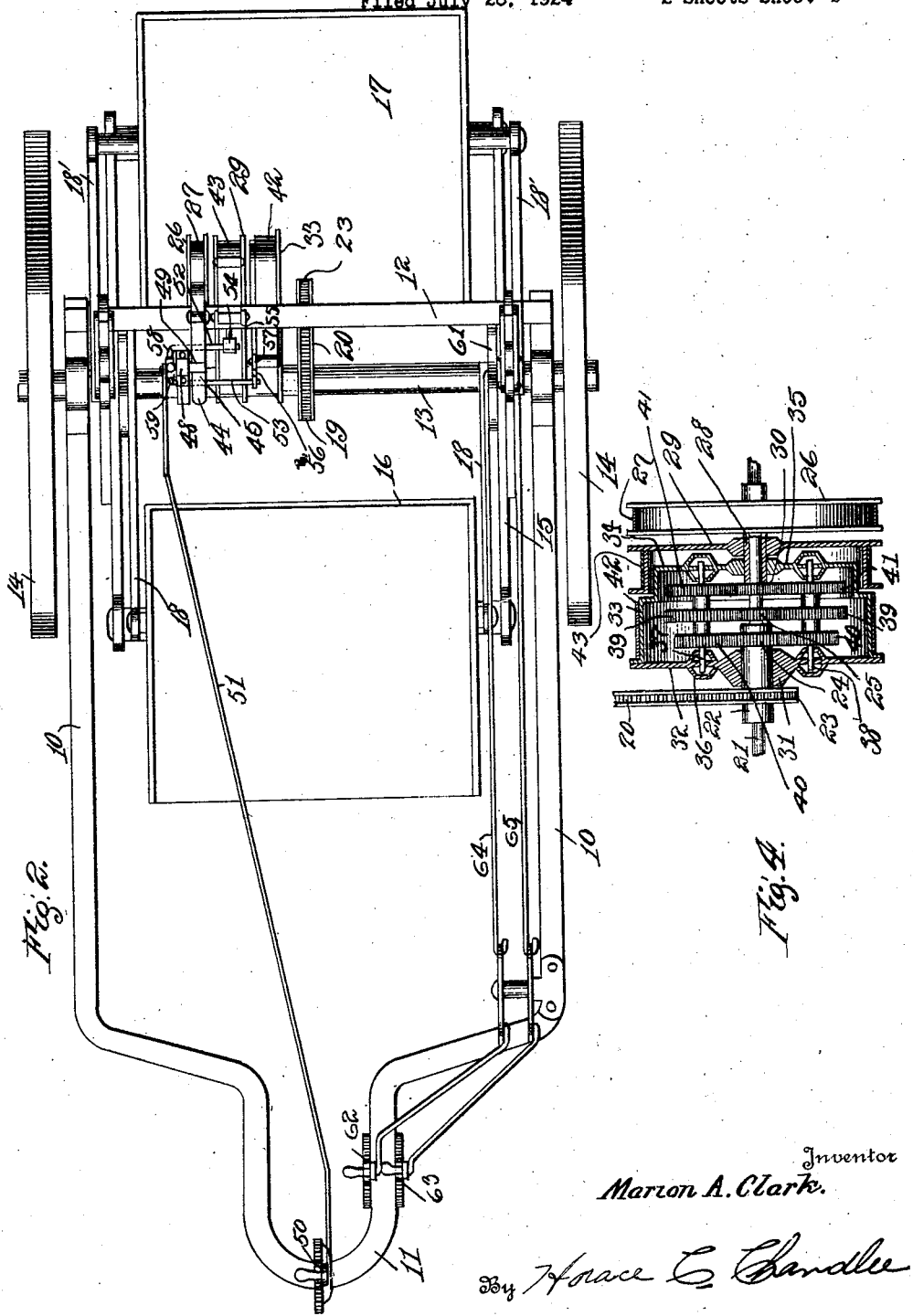

1,547,205

UNITED STATES PATENT OFFICE.

MARION A. CLARK, OF TULARE, CALIFORNIA.

SCRAPER.

Application filed July 28, 1924. Serial No. 728,681.

*To all whom it may concern:*

Be it known that I, MARION A. CLARK, a citizen of the United States, residing at Tulare, in the county of Tulare, State of California, have invented certain new and useful Improvements in Scrapers; and I do hereby declare the following to be a full, clear, and exact description of the invention, such as will enable others skilled in the art to which it appertains to make and use the same.

This invention relates to new and useful improvements in scraping machines, and particularly to scraping machines for grading road and like surfaces.

One object of the invention is to provide a device of this character which has a large capacity, and which is capable of easy and positive operation.

Another object is to provide a scraping machine which has two buckets capable of alternate scraping action upon a surface, and which may be supported in load carrying position, and then simultaneously dumped.

Another object is to provide a machine of this character wherein the buckets are arranged to be brought into scraping position, successively, and the loaded bucket maintained against dumping while the other bucket is in scraping position.

A further object is to provide a novel mechanism for causing the buckets to be brought into scraping action, successively, and simultaneously dumped so as to spread the soil on a surface to different thicknesses, or completely dumped without any spreading action.

Other objects and advantages will be apparent from the following description when taken in connection with the accompanying drawings.

In the drawings:

Figure 1 is a side elevation of a machine made in accordance with the present invention, one of the buckets being in scraping position, and the other one in carrying position.

Figure 2 is a top plan view of the machine.

Figure 3 is a perspective view of the buckets and their connecting means.

Figure 4 is a detail sectional view of the gearing, clutches, brake, and driving means, for moving the buckets into their different positions.

Referring particularly to the accompanying drawings, there is shown a frame which includes the longitudinal side bars 10, connected at their forward ends by the curved bight portion 11, to the latter of which any suitable draft means is adapted to be connected. Carried by the rear end of the frame, and extending upwardly therefrom, is the inverted angular U-shaped frame 12. Rotatably supported at its end portions, on the side bars 10, of the main frame, is the axle 13, and on the ends of the axle are secured the ground wheels 14. Centrally pivoted on each end of the axle, inwardly of the side bars of the frame, is a longitudinally extending bar 15, and disposed between the opposite ends of said bars 15, and pivotally connected centrally thereto, are the scraping buckets 16 and 17, respectively. Pivotally connected to each side of the front bucket 16, and extending rearwardly therefrom, with said pivotal connections in vertical alinement with each other and with the pivotal connections of the forward ends of the bar 15, are the links 18. Similar links 18' are similarly connected to the sides of the rear bucket 17, and extend forwardly therefrom. Fixed on the intermediate portion of the axle 13, for rotation therewith, is a sprocket wheel 19, with which is engaged a chain 20. Rotatably supported in the upper portion of the vertical frame 12, and extending transversely of the machine, is a shaft 21, on which is rotatably supported the tubular shaft 22, said shaft 22 having a sprocket wheel 23 keyed on one end thereof, while a gear 24 is keyed on the other end of the tubular shaft. Keyed on one end of the shaft 21, adjacent the gear 24, is a gear 25, and keyed on this shaft, at a suitable distance from the gear 25, is the brake drum 26, around which is engaged the brake band 27. On the shaft 21, adjacent the brake drum is a tubular shaft 28, and keyed on one end of this shaft is a drum 29, and on the other end is keyed a gear 30. Rotatably mounted on the first tubular shaft 22, is the hub portion 31 of a disk 32, to which is secured the flange 33, of a second disk 34, which latter disk has its hub portion 35 rotatably supported on the shaft 28. Extending between the disks 32 and 34, and having their ends rotatably supported in bearings 36, carried by said disks, are the shafts 37 and 38. Each of the shafts 37 and 38 has an intermediate gear 39 which meshes with the gear 25, and the end gears 40 and 41, which mesh with the gears 24 and 30, respectively. Around the flange 33 is engaged a band 42, while around the drum 29 is engaged a band 43. Pivotally supported adjacent one of its ends, on the frame 12, is a lever 44, said lever having a central elevated portion 45 formed with a depression or recess 46 in its highest portion, and with the end portions of the lever inclining downwardly and outwardly away from the central portion. The pivoted end of the lever 44, beyond the pivot thereof, is secured to one end of the brake band 27. Mounted on a pivot 47, arranged below the depression 46 of the lever 44, is a vertically disposed lever 48, having a roller 49 projecting from one side thereof, said roller normally lying within the recess 46, for a purpose to be explained later herein. On the forward end of the main frame of the machine there is mounted a vertical lever 50, said lever being connected with the upper end of the lever 48 by means of the link 51, whereby the lever 48 may be rocked to move the roller 49 forwardly or rearwardly from the recess 46, and thereby permit the lever 44 to rock and release the brake band. Mounted at opposite sides of the pivot 47 are the shafts 52 and 53, the former having an upwardly extending radial arm 54, on one end, which is connected to the band 42, by means of a link 55, while the corresponding end of the other shaft 53 has a downwardly extending radial arm 56, which is connected to the band 43, by means of the link 57. On the other end of the shaft 52 there is secured a vertical arm 58 which lies in the path of movement of the lever 48, and is adapted to be engaged and moved thereby, while a vertical arm 59 is secured to the corresponding end of the shaft 53 and is arranged to be engaged by the other side of the lever 48.

Mounted for rocking movement on the ends of the axle 13, are the pairs of vertically disposed plates 60 and 61, the latter being disposed inwardly of the former. Pivotally connected to the plates 60, above and below the axle 13, respectively, are the inner ends of the links 18′, while the inner ends of the links 18 are pivotally connected to the plates 61, above and below the axle, respectively. On the forward end of the main frame there are mounted the operating levers 62 and 63, the former being connected with the upper end of one of the inner plates 61, by means of a link 64, while the latter is connected with the upper end of the adjacent outer plate 60, by means of the link 65.

Mounted on each end of the shaft 21 is a gear 66. Pivotally connected to each of the bars 15, a short distance forwardly of its center, is the lower end of an upwardly and rearwardly extending rack bar 67, the teeth of which respectively engage the gears 66, of the shaft 21. Straddling each of the rack bars 67, adjacent the upper end thereof, is a housing 68, the rear portion of which receives the end of the shaft 21 therethrough, while the forward portion carries a pair of rollers 69 which engage with the untoothed edge face of the rack bar, to maintain the rack bar in proper and constant mesh with the gear 66. By this construction, when the shaft 21 is rotated, the rack bars will be moved to rock the bars 15, so as to elevate or lower the buckets.

When the lever 50 is in its intermediate or upright position, the roller engages in the depression of the lever or arm 44 and holds said arm down so that the brake band 27 is frictionally engaged with the drum 26. This holds the shaft 21 against rotation, and maintains the buckets in position against rocking movement on the axle. When the lever 50 is shifted backwardly, the lever 44 is released and the brake band loosened from its grip on the drum 26, and at the same time the lever 48 engages with the arm 58, causing the shaft 52 to be rocked and the band 43 to be frictionally drawn around the drum 29, thus holding the drum against rotation, the drum 34 will revolve in a reverse direction, pulling the gear 25 in a reverse direction, thus causing the shaft 21 to be rotated backwardly. When, however, the lever 50 is shifted forwardly the lever 44 is released, and the brake band released from its drum, whereupon the lever 59 will be engaged by the lever 48, and the shaft 53 rocked to cause the tightening of the band 42 on the drum 34. The reverse gear drum 29 then rotates in a forward direction, but at a greater rate of speed than the brake drum, thus causing the shaft 21 to be rotated to dump the loaded bucket.

Assuming that the Figure 1 shows the bucket 16 in scraping position, and the bucket 17 carrying a load. If it is desired to dump the load from the bucket 17, the operator pushes the lever 63 forwardly, which, through the medium of the link 65, causes the plates 60 to be rocked forwardly. As the plates 60 rock forwardly the links 18′ act upon the rear bucket 17 to tilt the forward edge downwardly, with the result that the contents of the bucket will fall therefrom. Pulling the lever 63 rearwardly into the position of Figure 1, the bucket will be restored to its horizontal position. Assuming that the bucket 17 contains a load, and the bucket 16 is also full, the operator moves the lever 50 forwardly, which causes the shaft 53 to be rocked and the band 43 to be tightened in the drum 29, with the result that the reverse gear will be operated to cause the forward bucket 16 to be elevated and the rear bucket 17 to be lowered so that both buckets will be disposed in the same horizontal plane. The driver then moves the lever 50 until the roller 49 lies within the recess 46, when the brake band 42 will be tightened on the drum 33, to hold the buckets from any rocking movement.

If it is desired to dump the contents of the front bucket 16, the driver pushes the lever 62 forwardly, which causes the inner plates 61 to be rocked, with the result that the links 18 will tilt the said bucket forwardly, releasing its load. To dump the rear bucket the lever 63 is similarly operated, which rocks the outer plates 60, and causes the links 18' to tilt this bucket 17 forwardly.

Normally the lever 48 stands in a vertical position, with the roller 49 within the recess 46, this accomplishing the downward pressure on the lever or arm 44, and the tightening of the band 27 on the brake drum 26. This will hold the buckets in the position to which they have been moved by one or the other of the levers 62—63.

By this construction, the driver can place the buckets in scraping position successively, dumping position singly or simultaneously, or hold them in elevated load carrying position.

What is claimed is:

1. A scraping machine including a frame, a drive shaft on the frame, a driven shaft on the frame, driving connections between the shafts for driving the driven shaft in either direction, means for throwing the connections into and out of operation, scrapers mounted on the frame and arranged for rocking movement into and out of scraping position, into and out of load carrying position, and into and out of dumping position, and means on the scrapers and operatively engaged with the driven shaft for rocking the scrapers into and out of such positions.

2. A scraping machine including a frame, a drive shaft on the frame, a driven shaft on the frame and operatively connected with the driving shaft, a combined clutch, brake and reverse gear associated with the driven shaft, scrapers mounted on the frame for rocking movement into and out of scraping position, into and out of load carrying position, and into and out of dumping position, and means for actuating the said combined clutch, brake and reverse gear for moving the scrapers into and out of said positions.

3. A scraping machine including a frame, a drive shaft on the frame, a driven shaft operatively connected with the drive shaft, a rocking frame on the first frame, scrapers movably supported on the ends of the rocking frame, paralleling links connecting the scrapers, gears on the driven shaft, racks carried by the rocking frame and engaged with the gears, and means connected with the links for dumping the scrapers.

In testimony whereof I affix my signature in the presence of two witnesses.

MARION A. CLARK.

Witnesses:
S. I. RAGAN,
W. R. CLARK.